Jan. 19, 1943.   H. E. ALTGELT   2,308,667
PLOW CONSTRUCTION
Filed April 17, 1940   4 Sheets-Sheet 3
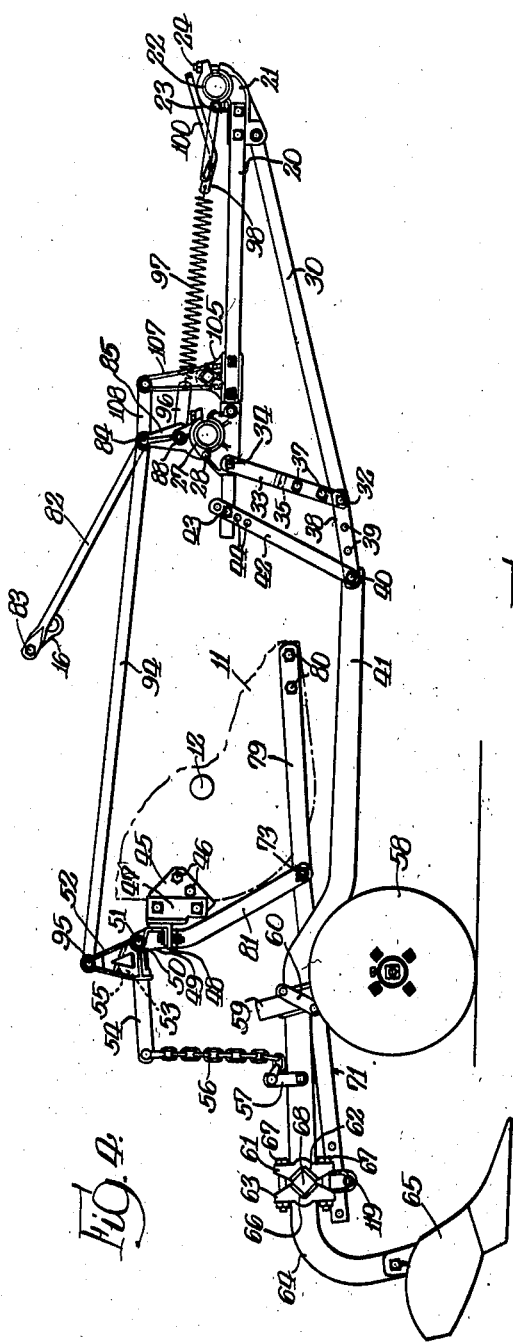
INVENTOR.
Herman E. Altgelt,
BY John P. Smith
ATTORNEY.

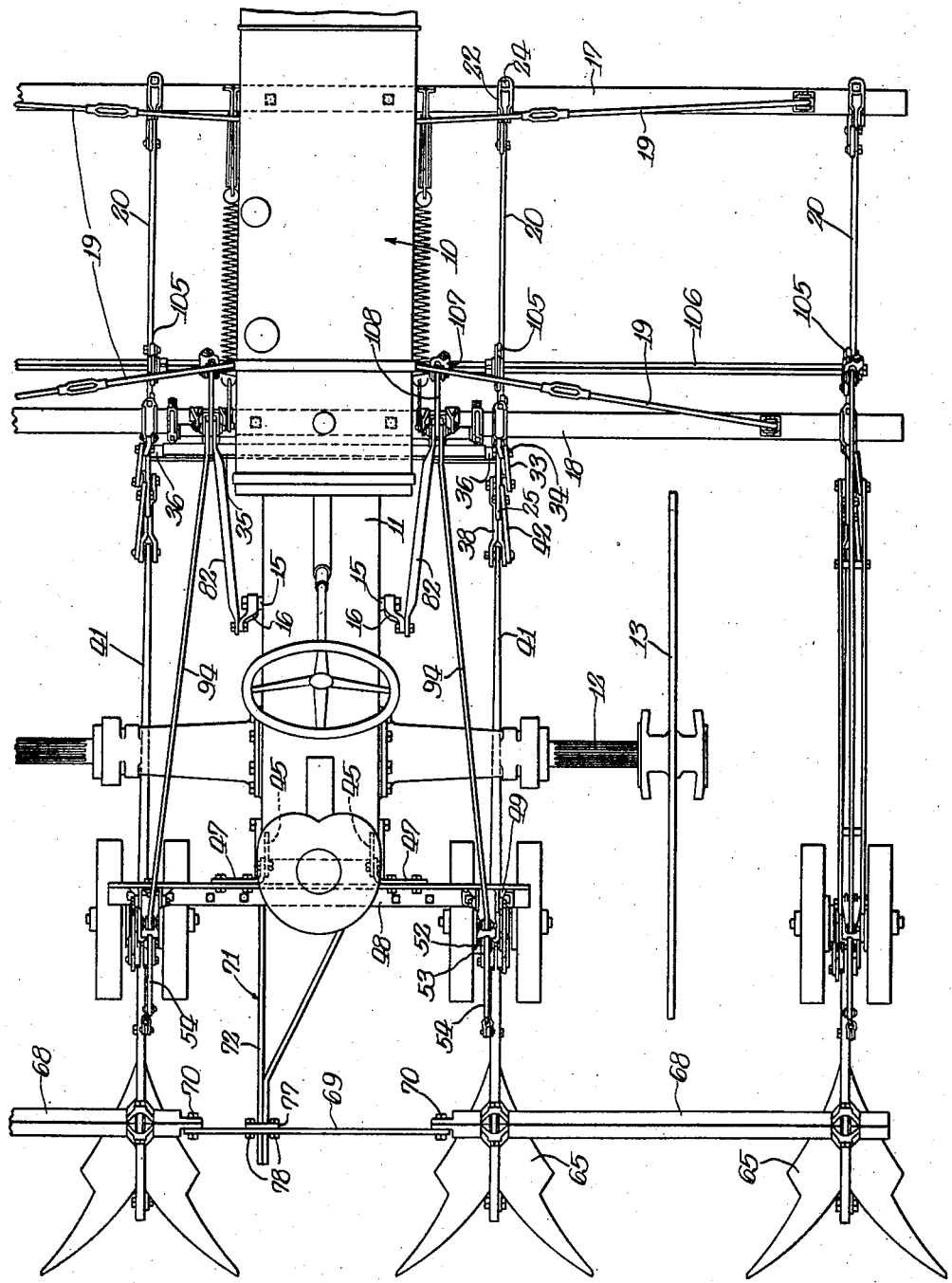

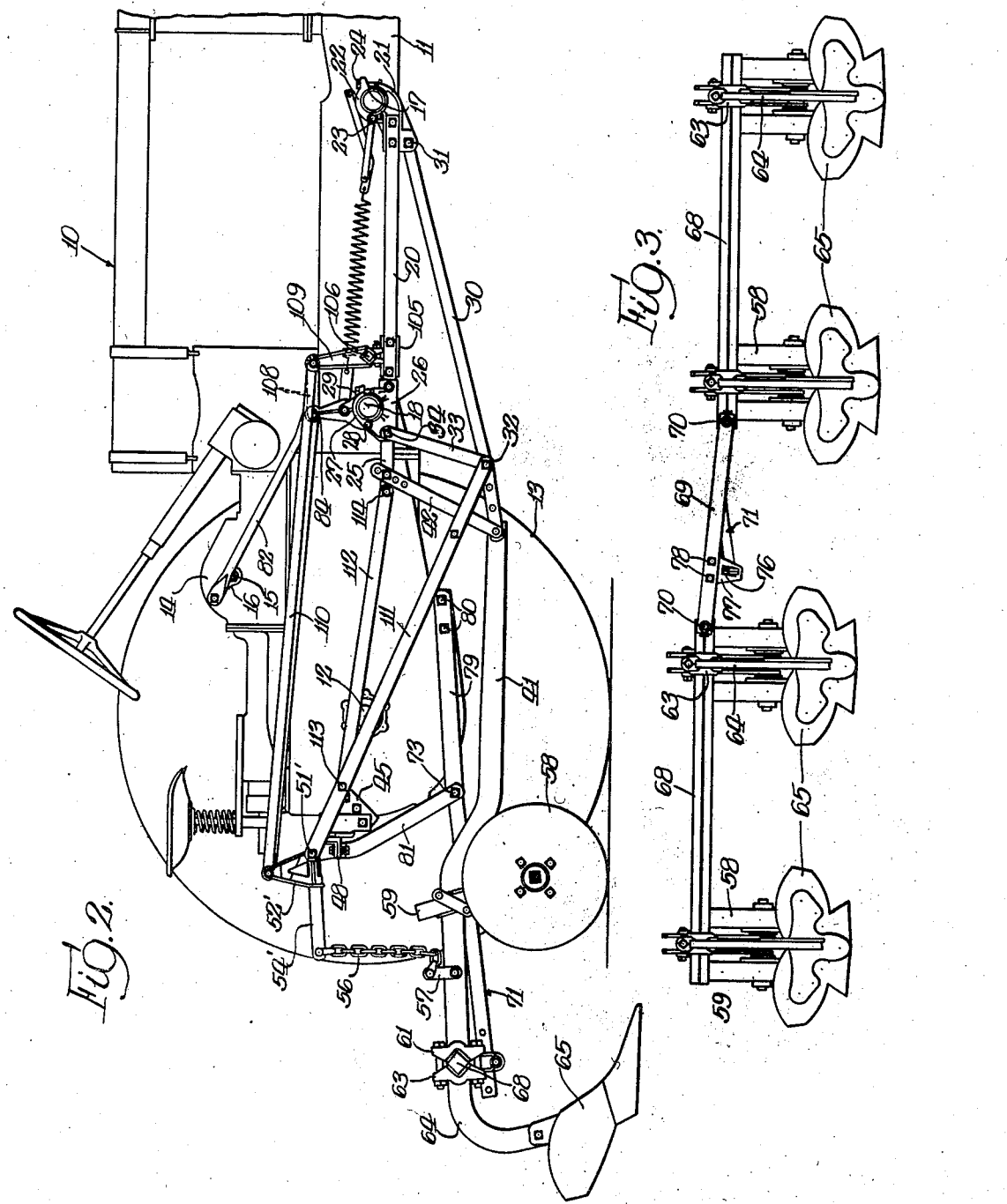

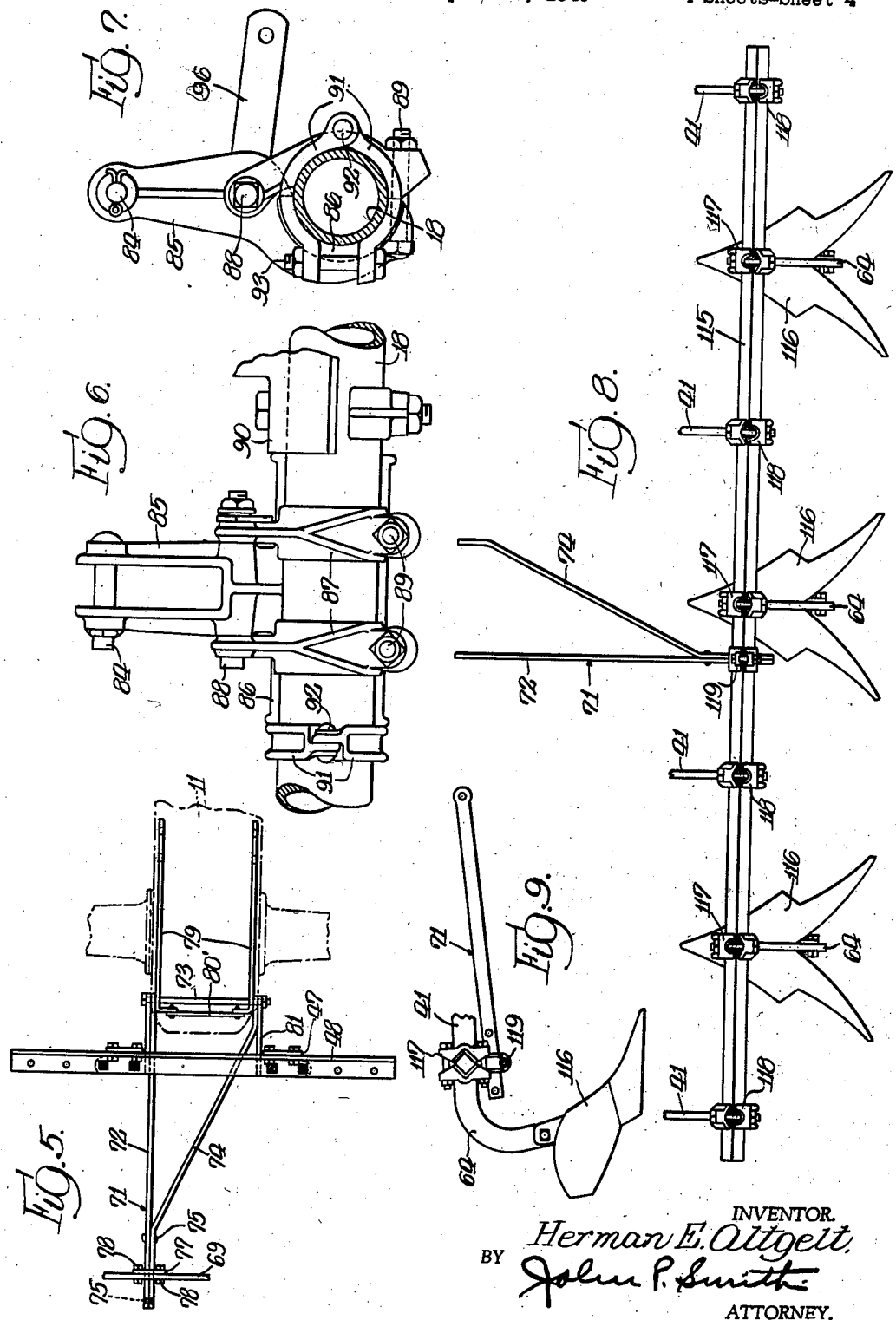

Patented Jan. 19, 1943

2,308,667

UNITED STATES PATENT OFFICE 2,308,667

PLOW CONSTRUCTION

Herman E. Altgelt, South Bend, Ind., assignor to Oliver Farm Equipment Company, a corporation of Delaware Application April 17, 1940, Serial No. 330,017

26 Claims. (Cl. 97—47)

The present invention relates generally to plows, but more particularly to a novel and improved tool bar lister plow construction which is adapted to be attached or pivotally connected at a point intermediate the front and rear wheels of the tractor with the earth working tools located rearwardly of the rear traction wheels.

One of the primary objects of the present invention is to provide a novel and improved four row lister attachment for tractor whereby means are provided for flexibly connecting the lister beams together so as to secure uniform depth penetration of the plow bases in uneven, rolling or terraced land.

A further object of the invention is to provide a novel and improved lister plow in which four bases are arranged in two pairs so that the two pairs are attached to two transversely extending tool bars and have means associated therewith for operatively raising and lowering the bases by the power lift mechanism of the tractor.

A further object of the invention is to provide a novel and improved construction of a tool bar lister plow of the four base type having a flexible connection between each pair of bases so that the gauge wheels for each base serve to control the depth penetration so as to maintain uniformity in this respect and also having means pivotally connected to the tractor for preventing lateral movement with respect to the tractor.

A still further object of the invention is to provide a novel and improved lister plow of the four row trailer type in which a novel rigid frame construction is located intermediate the front and rear wheels of the tractor having means associated therewith so that the forward end of the beam of the individual base may be adjusted for regulating or controlling the suction of the bases.

Another object of the invention is to provide a novel and improved means of attaching lister bases to a power lift tractor construction by means of which two or more plow bases may be attached either to a single tool bar or tool bar sections flexibly connected together.

These and other objects are accomplished by providing a construction and an arrangement of the various parts in the manner hereinafter described and particularly pointed out in the appended claims.

Referring to the drawings:

Fig. 1 is a top plan view of a fragmentary portion of a tractor showing the manner in which my improved lister plow is attached thereto;

Fig. 2 is a side elevational view of the tractor lister plow attachment shown in Fig. 1 illustrating primarily the construction of the outermost gang;

Fig. 3 is a rear elevational view of the gangs on the opposite sides of the longitudinal center of the tractor showing the manner in which each pair of bases are flexibly connected together;

Fig. 4 is a fragmentary side elevational view showing the inner gang construction and the manner of its attachment;

Fig. 5 is a fragmentary detailed plan view showing the manner in which the guide member is pivotally attached to the tractor for preventing lateral movement of the plow bases with respect to the frame of the tractor;

Fig. 6 is an enlarged fragmentary view of the lifting crank showing the manner in which the same is pivotally mounted on the pipe or support;

Fig. 7 is a side elevational view of the same;

Fig. 8 is a top plan view of a modified form showing the single rigid bar substituted for the two shorter bars on which a three row lister may be mounted;

Fig. 9 is a side elevational view of the same;

Fig. 10 is an enlarged side elevational view of a quick acting toggle link mechanism for a balancing spring; and Fig. 11 is a similar view showing the toggle link in extended portion.

In illustrating one form of my invention, I have shown the same in connection with a more or less conventional type of tractor generally indicated by the reference character 10. The tractor in this instance comprises the usual longitudinally extending main frame 11 which has its front end supported on the usual front steering wheel (not shown in the drawings), and the rear end supported on the main axle 12 and rear traction or driving wheels 13. The tractor in this instance is provided with the usual motor transmission mechanism and half revolution clutch encased in the housing 14 located in substantially the longitudinal or transverse center of the tractor. This half revolution clutch mechanism is of any standard or conventional form and therefore a detailed description of the function and operation of the same is unnecessary. This half revolution clutch mechanism is provided with a clutch or power take-off shaft 15 which projects on the opposite sides. The opposite ends of the shaft 15 are provided with the usual power cranks 16. Secured adjacent the front end of the tractor and extending transversely with respect thereto at the opposite sides thereof is a front supporting beam or pipe 17.

Secured to an intermediate portion of the frame of the tractor and rearwardly of the front pipe 17 is a transversely extending second supporting beam or pipe 18. Both pipes 17 and 18 have their opposite ends projecting laterally beyond the threads of the rear traction wheels 13. The supporting pipes are suitably braced to the tractor frame structure by means of brace rods 19.

The lister plow construction in the present instance consists of four lister bases located at the rear of and on the opposite sides of the tractor and arranged in pairs. Therefore a description of the set on one side will suffice for the set on the other side. The operative connections for connecting and supporting the inner bases or the ones adjacent the frame of the tractor are similar to that which supports the outermost bases or the ones located outside or laterally of the traction wheels.

The inner and outer longitudinally extending draft beams are supported by similar frame structures which comprise a longitudinally extending frame member 20 which has its front end secured to a bracket 21. The bracket 21 has a semi-circular recess which engages the supporting pipe 17 by means of a semi-circular clamping cap 22 which is pivoted to the bracket 21 as shown at 23. The cap 22 and bracket 21 are secured together by means of a bolt 24. The rear end of the frame member 20 projects rearwardly as shown at 25 and is secured to a second bracket 26 which has a semi-circular recess engaging the rear supporting pipe 18. The bracket 26 is provided with a clamping cap 27 which is pivoted at 28. The bracket 26 and clamping cap 27 are secured to the pipe 18 by means of a bolt 29. Extending rearwardly and downwardly below the longitudinal frame bar 20 is a second frame 30 which has its forward end secured to the bracket 21 by means of a bolt 31. The rear end of the frame member 30 is connected as shown at 32 with the lower end of the brace bar 33. The upper end of the brace bar 33 is secured by means of a bolt 34 to the bracket 26. These three frame members 20, 30 and 33 together with their associated brackets, form in effect a triangular frame structure for supporting the front end of the beam and constituting the main draft frame for each of the lister beams as will hereinafter be more fully described. The frame structure above described, especially those adjacent the tractor frame, are braced together by an adjustable transverse frame member 35 which extends under the tractor and is connected at its outer ends with angle members 36 which in turn are secured by means of bolts 37 to the inner brace members 33 (see Figs. 1 and 4). Pivotally secured to the rear end of the frame member 30 on the bolt 32 is a link 38 which comprises two flat steel members having their intermediate portions secured together by rivets 39 and their opposite ends forked or bifurcated for forming the pivotal connection at both ends thereof. Pivoted on the bolt 40 in the bifurcated rear end of the link 38 is a longitudinally extending draft beam 41. The pivot 40 of the beam 41 may be adjusted vertically for controlling the suction of the lister base by means of a link 42 which has its lower end pivotally connected on the bolt 40 and its upper end adjustably secured by means of a bolt 43 to the rear extended end of the longitudinal frame member 20. The upper end of this link 42 is provided with a plurality of spaced apart apertures 44 for effecting this adjustment.

The rear portion of all of the inner beams are supported or suspended from the rear of the tractor or frame 10 by means of oppositely disposed plates 45 secured to the tractor frame by means of bolts 46. Secured to each of the plates 45 are angle brackets 47. Secured to the angle brackets 47 is a transversely extending angle or frame member 48 which projects laterally beyond the frame 11 of the tractor within the traction wheels 13. Secured adjacent the opposite ends of the transverse frame member 48 are bearing brackets 49 which have vertically extending spaced apart bearing ears 50. Pivoted on the bolt 51 between the bearing ears 50 is a bell crank 52. The bell crank member has a centrally and vertically disposed slot 53 which has its forward end pivoted on the bolt 51. The arms 54 normally rest on the bottom of the slot in the bell crank 52 and are limited in their upward movement with respect to the bell crank member by a stop 55. The purpose of this lost motion between the arm 54 and the bell crank bracket 52 is for permitting the arm to yield if the same is struck by the plow beams when the tractor is moved through a ditch or other irregularity in the contour of the ground. The outer or free end of the arm 54 is connected by means of a chain 56 to a bracket 57 attached to the plow beam 41 at a point rearwardly of the tractor. Each plow beam is supported on a pair of gauge wheels 58 which are carried on the standard 59 which in turn are adjustably secured to the beam by clamping bracket 60. These wheels may be adjusted with respect to the respective beams for regulating the depth penetration of the lister bases. Formed on the rear end of each of the beams are clamp-like portions 61 having horizontal V-shaped recesses 62 formed therein. Complimentary to the clamping portion 61 is a similar clamping member 63 formed on the forward end of a curved stub beam 64. Secured to the lower end of the stub beam 64 is a lister base 65. The clamping portion 63 of the stub beam 64 is provided with a V-shaped recess 66. Secured between the complimentary clamping members 61 and 63 of the adjacent beams and stub beams on each side of the tractor frame by means of bolts 67 are relatively short tool bars 68. Each tool bar in this instance rigidly ties together one pair of plow bases on each side of the tractor as will be clearly disclosed in Figs. 1 and 3 of the drawings. The inner ends of each of the tool bars 68 located on the opposite side of the longitudinal center of the tractor are flexibly connected together by means of their link 69 which has its opposite ends pivotally connected at 70 to each of the bars.

All of the bases are prevented from lateral movement with respect to the longitudinal frame of the tractor by a guiding member generally indicated by the reference character 71. The guiding member 71 consists of two bars, one of which is shown at 72 is a longitudinally extending straight bar which has its forward end pivotally attached to a bolt 73 on one side of the tractor frame. The other bar 74 diverges forwardly and has its forward end pivotally connected to the same bolt 73 on the other side of the tractor frame. The rear ends of the bars 72 and 74 extend parallel and are riveted together by means of rivets 75. The free or rear end of the guiding member 71 extends through a vertical slot 76 formed in a depending bracket 77 which in turn is secured to the link 69 by means of bolts 78 (see Figs. 1, 4 and 5 of the drawings). The bolt 73 is supported in the rear end of two oppositely disposed frame members 79 secured to the main frame 11 of the tractor by means of bolts 80. The rear ends of the frame members 79 are secured together by a transverse brace 80'. The rear end of the frame members 79 are braced by oppositely disposed braces 81 which have their lower ends secured to the bolt 73 and their upper ends secured to the transverse angle member 48.

From the above description and from an examination of Fig. 3 of the drawings, it will be readily seen that each individual lister base will gauge its own depth penetration by its own individual or respective gauge wheels 58 regardless of the unevenness or contour of the ground by reason of the flexibility afforded to the tool bars 68 through the medium of the link 69. It will also be noted that all of the bases are maintained in longitudinal alignment with respect to the tractor by reason of the pivoted guide member 71. The power lift mechanism and the operative connections for raising and lowering the inner plow beams and their associated lister bases includes a link 82 having one end thereof as shown at 83 connected to the power crank 16 of the power lift mechanism and the other end thereof as shown at 84 to a lever or arm 85 journaled on the pipe 18. The bearing portion of the arm 85 on the pipe 18 is formed by having a semi-cylindrical portion 86 formed integrally with the arm 85. The arm 85 is detachably journaled on the pipe 18 through the medium of spaced apart bearing caps 87 which are pivoted to the arm 85 on a bolt 88. The free end of these bearing caps are secured to the semi-circular portion 86 by bolts 89. The inner end of the semi-cylindrical bearing sleeve 86 abuts the flange 90 which in turn is formed integrally with the tractor frame 11. The semi-cylindrical bearing sleeve is abutted on the other end by a collar comprising two semi-circular rings 91 which are pivoted as shown at 92 at one end thereof and clamped together about the pipe 18 of a bolt 93 (see Figs. 6 and 7). A link 94 has its forward end pivotally connected to the arm 85 by the bolt 84 and its rear end connected as shown at 95 to the bell crank bracket 52. From the above description it will be readily seen that upon the tripping of the power lift mechanism in the manner well understood in the art, the half-revolution clutch will revolve the power crank 16 through an arc of 180°, thereby oscillating the lever or arm 85 about the pipe 18 to actuate the bell crank 52 and thereby lift the arm 54 to raise the inner beam and its associated lister base to inoperative or raised position. The second trip of the half revolution clutch mechanism will return it to ground engaging position or the position shown in Fig. 4 of the drawings.

A balancing spring to overcome part of the weight of lifting the bases includes a link 96 which has one end thereof connected to the arm or lever 85 on the bolt 88 and the other end thereof connected to a spring 97. The forward end of the spring 97 is connected to a relatively short link 98 of a toggle link mechanism. The forward end of the short link 98 is pivotally connected as shown at 99 to an operating offset lever 100. One end of the lever 100 is pivotally attached as shown at 101 to the rear end of a link 102. The forward end of the link 102 is pivotally attached as shown at 103 to a hook member 104 which is adapted to engage the forward supporting pipe 17 as clearly shown in Figs. 9 and 10 of the drawings.

From the above description it will be observed that by the toggle link arrangement of the links 98, 100 and 102 the spring 97 may be quickly connected in position with the hook 104 extended over the pipe 17 so that upon the manipulation of the lever 100 from the position shown in Fig. 11 to that shown in Fig. 10 of the drawings, the tension of the spring 97 is immediately placed upon the arm 85 to assist in balancing the weight of the lister plow bases.

The mechanism for operatively connecting the power lift mechanism and supporting the outside or outermost beams and associated plow bases will next be described. Secured to each of the frame or brace members 20 at a point adjacent the rear supporting pipe 18 are bearing brackets 105. Journaled in the bearing brackets 105 on each side of the tractor is a rock shaft 106. Secured to the inner end of each of the rock shafts 106 is an upstanding crank arm 107 (see Figs. 1 and 4). The upper end of the crank arm 107 is connected by means of a link 108 to the bolt 84 of the arm 85. Secured to the outer end of each of the rock shafts 106 is an upstanding crank arm 109. The free end of the arm 109 is connected by means of a link 110 to the upper end of the bell-crank bracket 52' of the same identical construction of the bell-crank 52. The bell crank 52' is pivotally supported between two inclined spaced apart parallel supporting bars 111 which have their lower ends secured to the frame members 30 and 33 by the bolt 32. These bars 111 are further supported in their inclined positions by a brace bar 112 which has its rear end secured between and adjacent the rear ends of the bars 111 by the bolt 113 and its forward end secured by means of a bolt 114 to the rear end of the outside bar or frame member 20. The bell-crank bracket 52' is operatively connected to the outside beam through the medium of a rearwardly extending floating crank 54', a chain 56 and a bracket 57, similar to the manner in which the inner beams are connected to the cooperating bell-crank 52.

From the above description it will be observed that the bars 111 and 112 form in effect a cantilever construction or suspension extending rearwardly from the supporting pipes 17 and 18 and in a position outside the traction wheels 13. This arrangement permits the power lift mechanism and particularly the bell-crank 52' to be wholly supported on the cantilever construction without any support from the rear end of the tractor.

In the modified construction shown in Figs. 8 and 9 of the drawings, I have provided a single rigid tool bar 115 which may be substituted for the two separate tool bars 68 shown in Figs. 1, 2 and 3 of the drawings. When this tool bar 115 is employed, three lister bases, as shown at 116, may be attached to the rigid tool bar 115 through the medium of stub beams 64 and special clamps 117 so that the center lister base trails in the longitudinal center of the tractor with the outside bases adjusted in spacing relation in accordance with the requirements of the operator. When the tool bar 115 is thus attached, the same special clamping member similar to those shown at 117 are attached to the four longitudinally extending beams 41 as shown at 118. The special tool bar shown in Figs. 8 and 9 of the drawings is also guided from lateral displacement by the pivoted guide member 71 which engages a vertical slot in a bracket 119 attached to the tool bar 115. Obviously any number of bases may be attached to the tool bar 115.

Summarizing the function and advantages of operating of my improved lister plow, it will be obvious that by operatively connecting the beams of the tool bar to rigid draft frame structures attached to the transversely extending spaced apart pipes adjacent the front end of the tractor, I have provided an arrangement where the draft connection to the outside lister bases are attached beyond or outside the traction wheels and thereby make it possible to make use of the sectional tool bar flexibly connected together so that the individual base will secure a uniformity of penetration of the earth by reason of the gauge wheels being capable of following the uneven contour of the ground. This flexibility of construction is still permissible without permitting the lateral displacement of the bases with respect to the frame of the tractor. As previously pointed out, all the bases may be raised or lowered by the power lift mechanism which derives its power from the conventional half revolution clutch drive of the tractor. This is accomplished by tripping the half-revolution clutch and through the medium of the power crank 16 located on the opposite sides of the tractor the crank arms 85 are actuated through the links 82 to actuate the bars 94 forwardly. These bars in turn actuate the bell-crank bracket to lift the arm 54 and chain 56 to raise the inside lister bases and associated beams. Simultaneously with their lifting operation, the arms 107 is actuated through the links 108 and crank 85 to actuate the rock shaft and through the connections hereabove described, the outside lister bases 65 are raised or lowered with the inner lister bases. During the operation of the lister plow should the tractor encounter a ditch, the floating arm 54 may yield with respect to its associate bell-crank bracket 52 or 52' and thereafter resume its normal position when the ditch is passed. As previously described, the suction of the individual bases may be regulated by adjusting the point of attachment as shown at 40 of each of the tool beams 41 by shortening or lengthening the position of the link 42 with respect to the frame member 20. This is permitted through the medium of the pivoted ling 38.

As previously pointed out, the rigid tool bar as illustrated in Figs. 8 and 9 of the drawings, may be substituted for the sectional tool bar 68 and three or more lister bases may be attached along the tool bar independent of the attachment of the beams 41. In this connection it will be observed that a relatively lighter rigid tool bar 115 may be employed than has heretofore been employed by reason of the outside beams 41 being attached beyond and outside the traction wheels of the tractor.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent:

1. The combination with a tractor having front steering and rear traction means, a plurality of longitudinally extending draft beams having their forward ends attached to said tractor between said front steering and rear traction means, transversely extending tool bars attached adjacent the rear ends of said beams rearwardly of said traction means, plow bases secured to said tool bar, means for flexibly connecting said tool bars together, and means carried by said tractor and operatively connected to said first named means for preventing lateral displacement of said plow bases with respect to said tractor.

2. The combination with a tractor having front steering and rear traction means, a plurality of longitudinally extending draft beams having their forward ends attached to said tractor between said front steering and rear traction means, transversely extending tool bars attached adjacent the rear ends of said beams rearwardly of said traction means, plow bases secured to said tool bar, means for flexibly connecting said tool bars together, and means pivoted to said tractor and operatively related with said first named means for preventing lateral displacement of said plow bases with respect to said tractor.

3. The combination with a tractor having front steering and rear traction means, a plurality of longitudinally extending draft beams having their forward ends initially adjustably and pivotally attached to said tractor between said front steering and rear traction means, certain of said beams located outside said traction means, a tool bar secured to the rear ends of said draft beams rearwardly of said traction means, and plow bases secured to said tool bar.

4. The combination with a tractor having front steering and rear traction means, a plurality of longitudinally extending draft beams having their forward ends adjustably and pivotally attached to said tractor between said front steering and rear traction means, certain of said beams located outside said traction means, a tool bar secured to the rear ends of said draft beams rearwardly of said traction means, plow bases secured to said tool bar, and means operatively connected between said bases and said tractor for preventing lateral displacement therebetween.

5. The combination with a tractor having front steering and rear traction means, a plurality of longitudinally extending draft beams located inwardly and outwardly of said traction means on both sides of said tractor, the forward ends of said beams being vertically adjustable and pivotally connected between said front steering and rear traction means, a tool bar secured to the rear ends of said beams, and plow bases secured to said tool bar.

6. The combination with a tractor having front steering and rear traction means, a plurality of longitudinally extending draft beams located inwardly and outwardly of said traction means on both sides of said tractor, the forward ends of said beams being pivotally connected between said front steering and rear traction means, a tool bar secured to the rear ends of said beams, plow bases secured to said tool bar, and means for operatively connecting said tool bar with said tractor for preventing lateral displacement of said bases with respect to said tractor.

7. The combination with a tractor having front steering and rear traction means, a plurality of longitudinally extending draft beams located laterally on each side of said tractor, means for connecting the forward ends of said beams to said tractor, a separate tool bar for connecting the rear ends of the beams on each side of the tractor, plow bases secured to said tool bars, and means for flexibly connecting said tool bars together.

8. The combination with a tractor having front steering and rear traction means, a plurality of longitudinally extending draft beams located on the opposite sides of said tractor with certain of said beams being located outside said traction means, a tool bar connecting the rear ends of the beams on each side of the tractor, plow bases secured to said tool bars, and means for flexibly connecting said tool bars together.

9. The combination with a tractor having front steering and rear traction means, a plurality of longitudinally extending draft beams located on the opposite sides of said tractor with certain of said beams being located outside said traction means, a tool bar connecting the rear ends of said beams on each side of the tractor, plow bases secured to said tool bars, and a link having its opposite ends pivotally attached to the inner ends of said tool bars for flexibly connecting said tool bars together.

10. The combination with a tractor having front steering and rear traction means, a plurality of longitudinally extending draft beams located on the opposite sides of said tractor with certain of said beams being located outside said traction means, a tool bar connecting the rear ends of the beams on each side of the tractor, plow bases secured to said tool bars, means for flexibly connecting said tool bars together, and a guiding lever pivoted to said frame and slidably connected to said link for preventing lateral displacement of said plow bases.

11. The combination with a tractor having front steering and rear traction means, a transverse supporting means secured to an intermediate portion of said tractor and extending laterally beyond said traction means, a cantilever construction secured to said supporting means and extending rearwardly therefrom outside said traction means, and an earth working tool having one end attached to said supporting means and its other end suspended from said cantilever construction.

12. The combination with a tractor having front steering and rear traction means, a transverse supporting means secured to an intermediate portion of said tractor and extending laterally beyond said traction means, a cantilever construction secured to said supporting means and extending rearwardly therefrom outside said traction means, a bell-crank pivoted to the rear end of said cantilever construction, operative connections for operating said lever from said tractor, and an earth working tool having one end attached to said supporting means and its other end connected to said bell-crank.

13. The combination with a tractor having front steering and rear traction means, power lift mechanism associated with and driven by said tractor, a transverse supporting means secured to an intermediate portion of said tractor and extending laterally beyond the tread of said traction means, a cantilever construction secured to said supporting means and extending rearwardly therefrom outside said traction means, a bell-crank pivoted to the rear end of said cantilever construction, means forming operative connections between said power lift mechanism and said bell-crank, and an earth working tool having one end attached to said supporting means and its other end connected to said bell-crank.

14. The combination with a tractor having front steering and rear traction means, power lift mechanism associated with and driven by said tractor, a transverse supporting means secured to an intermediate portion of said tractor and extending laterally beyond the tread of said traction means, a cantilever construction secured to said supporting means and extending rearwardly therefrom outside said traction means, a bell-crank pivoted to the rear end of said cantilever construction, means forming operative connections between said power lift mechanism and said bell-crank, a longitudinally extending draft beam having its forward end adjustably attached to said supporting means and its rear end connected to said bell-crank, and a plow base secured to the rear end of said draft beam.

15. The combination with a tractor having front steering and rear traction wheels, a motor for driving said tractor, a power take-off mechanism driven from said motor, transversely extending spaced apart supporting beams secured to an intermediate portion of said tractor and extending laterally beyond the tread of said rear traction wheels, a plurality of longitudinally extending draft beams located on the opposite sides of said tractor and on the opposite sides of each of said traction wheels, a tool supporting bar secured to the rear ends of said draft beams, spaced apart plow bases secured to said tool bar, individual bell-cranks carried by said tractor for each draft beam, connections between said bell-cranks and the respective draft beams, and operative connections between said power take-off mechanism and said bell-cranks for simultaneously raising and lowering said plow bases.

16. The combination with a tractor having front steering and rear traction wheels, a motor for driving said tractor, a power take-off mechanism driven from said motor, transversely extending spaced apart supporting beams secured to an intermediate portion of said tractor and extending laterally beyond the tread of said rear traction wheels, a plurality of longitudinally extending draft beams located on the opposite sides of said tractor and on the opposite sides of each of said traction wheels, a tool supporting bar secured to the rear ends of said draft beams, spaced apart plow bases secured to said tool bar, individual bell-cranks carried by said tractor for each draft beam, connections between said bell-cranks and the respective draft beams, levers pivoted on one of said supporting beams on each side of said tractor, operative connections between said levers and the respective bell-cranks for the inside draft beams, operative connections between each of said levers and said power lift mechanism, rock shafts journaled on the opposite sides of said tractor, operative connections between said rock shafts and the respective levers on the opposite sides of said tractor, and operative connections between said rock shafts and the respective outside draft beams whereby all of said plow bases may be simultaneously raised or lowered.

17. The combination with a tractor having front steering and rear traction wheels, a motor for driving said tractor, a power take-off mechanism driven by said motor, transversely extending implement supporting means secured intermediate the ends of said tractor, and extending laterally beyond the tread of said traction wheels, a plurality of longitudinally extending draft beams having their forward ends adjustably secured to said supporting means, certain of said draft beams located inwardly of said traction wheels, certain other of said draft beams being located outwardly of said traction wheels, tool bars secured to each set of draft beams on the opposite sides of said tractor, plow bases secured to said tool bars, gauge wheels secured to each draft beam for gauging the depth penetration of each of said bases, and means for operatively connecting said draft beams with said power lift mechanism for simultaneously raising or lowering all of said plow bases.

18. The combination with a tractor having front steering and rear traction wheels, a motor for driving said tractor, a power take-off mechanism driven by said motor, transversely extending implement supporting means secured intermediate the ends of said tractor and extending laterally beyond the tread of said traction wheels, a plurality of longitudinally extending draft beams having their forward ends adjustably secured to said supporting means, cetrain of said draft beams located inwardly of said traction wheels, certain other of said draft beams being located outwardly of said traction wheels, tool bars secured to each set of draft beams on the opposite sides of said tractor, plow bases secured to said tool bars, gauge wheels secured to each draft beam for gauging the depth penetration of each of said bases, bell-cranks carried by said tractor, operative connections between said bellcranks and said draft beams, and operative connections between said bell-cranks and said power lift mechanism for simultaneously raising or lowering all of said plow bases.

10. The combination with a tractor having front steering and rear traction means, transversely extending spaced apart supporting means secured to said tractor between said front steering and rear traction means, a plurality of beams connected to said supporting means and extending rearwardly therefrom on each side of said traction means, separate tool bars connecting the adjacent beams on each side of said tractor, and means for flexibly connecting said tool bars together.

20. A quickly detachable and spring actuated balancing mechanism including a spring and a toggle link mechanism comprising a link having one end attached to said spring and an operative offset lever having an intermediate portion pivoted to said link, a second link pivoted to said lever at a point adjacent the pivot of said first named link, and a hook pivotally attached to said last named link whereby upon the actuation of said lever about its pivotal connections with said links, said spring may be placed under tension.

21. The combination with a tractor having front steering and rear traction means, a plurality of longitudinally extending draft beams located on the opposite sides of said tractor with certain of said beams being located outside said traction means, tool bars connecting the rear ends of said beams on each side of said tractor, plow bases secured to said tool bars, and means for flexibly connecting said tool bars together.

22. The combination with a tractor having front steering and rear traction means, a plurality of longitudinally extending draft beams located on the opposite sides of said tractor with certain of said beams being located outside said traction means, tool bars connecting the rear ends of said beams on each side of said tractor, plow bases secured to said tool bars and a transverse link pivotally connected to the inner ends of said tool bars for flexibly connecting said tool bars together.

23. The combination with a tractor having front steering and rear traction means, a plurality of longitudinally extending draft beams located on the opposite sides of said tractor with certain of said beams being located outside said traction means, tool bars connecting the rear ends of said beams on each side of said tractor, plow bases secured to said tool bars and a transverse link pivotally connected to the inner ends of said tool bars for flexibly connecting said tool bars together, and gauge wheels connected to each of said draft beams for controlling the uniform depth penetration of each of said bases into the ground.

24. A quickly detachable and spring actuated balancing mechanism including the combination of a spring and a toggle link mechanism comprising a link having one end attached to said spring, an operative offset lever having an intermediate portion pivoted to said link, a second link pivoted to said lever at a point adjacent to said first named link, whereby upon the actuation of said lever about its pivotal connections with said links, said spring may be placed under tension, and means carried by said second named link for attachment to a support.

25. A quickly detachable device for tensioning a spring including the combination of a spring and a toggle link mechanism comprising a link having one end attached to said spring, an operative member having an intermediate portion pivoted to said link, a second link pivoted to said member at a point spaced from the pivot of said first named link, whereby upon the actuation of said member about its pivotal connections with said links, said spring may be placed under tension, the pivots of said member and said links being located with respect to each other so as to lock said toggle link mechanism when said spring is under tension, and means carried by said second named link for attachment to a support.

26. The combination of a tractor having front steering and rear traction means, a plurality of longitudinally extending draft beams having their forward ends attached to the tractor between the front steering and rear traction means, tool bars rigidly secured to the rear ends of said draft beams, means for flexibly connecting said tool bars together, plow bases connected to said tool bars rearwardly of said traction means, and means connected to said beams adjacent said plow bases for controlling the uniform depth penetration of each of said bases into the ground.

HERMAN E. ALTGELT.